United States Patent [19]

Hampe et al.

[11] Patent Number: 4,837,261

[45] Date of Patent: Jun. 6, 1989

[54] SURFACE TREATMENT PRODUCT

[75] Inventors: Patrick Hampe, Le Giotto, Monaco; Serge Kelbert, Cros De Cagnes, France

[73] Assignee: DYNA-5, Inc., Memphis, Tenn.

[21] Appl. No.: 283,052

[22] Filed: Dec. 7, 1988

Related U.S. Application Data

[63] Continuation of Ser. No. 852,361, Apr. 15, 1986, abandoned.

[30] Foreign Application Priority Data

Dec. 20, 1985 [FR] France ................................ 85 18999

[51] Int. Cl.$^4$ ............................................... C08K 5/54
[52] U.S. Cl. ..................................... 524/268; 524/284; 106/3
[58] Field of Search ..................... 524/268, 284; 106/3

[56] References Cited

U.S. PATENT DOCUMENTS

| | | | |
|---|---|---|---|
| 3,579,540 | 5/1971 | Ohlhausen | 260/33.4 |
| 3,992,335 | 11/1976 | Denissenko et al. | 524/377 |
| 4,013,579 | 3/1977 | Nakasone et al. | 252/142 |
| 4,039,465 | 8/1977 | Hutchinson | 252/171 |
| 4,076,861 | 2/1978 | Furukawa et al. | 427/132 |
| 4,124,523 | 11/1978 | Johnson | 252/145 |
| 4,181,622 | 1/1980 | Gavin | 252/143 |
| 4,212,759 | 7/1980 | Young et al. | 252/119 |
| 4,311,608 | 1/1982 | Maurice | 252/143 |
| 4,689,168 | 8/1987 | Requejo | 252/139 |

FOREIGN PATENT DOCUMENTS

| | | | |
|---|---|---|---|
| 2364153 | 11/1974 | Fed. Rep. of Germany | 106/3 |
| 56-95663 | 8/1981 | Japan | 524/268 |

Primary Examiner—Joseph L. Schofer
Assistant Examiner—N. Sarofim
Attorney, Agent, or Firm—Finnegan, Henderson, Farabow, Garrett & Dunner

[57] ABSTRACT

A product in the form of a readily spread or sprayed liquid is disclosed for the treatment of floors and like hard surfaces. The product is characterized in that it includes an acid, preferably oxalic acid, a silicone or silicones, preferably in the form of a silicone oil and a polymerizable silicone resin, a solvent for the acid, a solvent for the silicone, an emulsifier and preferably a surfactant.

17 Claims, No Drawings

SURFACE TREATMENT PRODUCT

This application is a continuation of application Ser. No. 852,361, filed Apr. 15, 1986, abandoned.

The present invention relates in a general way to the treatment of floors or the like with regards more particularly to the treatment of floors or like surfaces whose surface material is hard and/or smooth.

It can therefore relate to floors, walls and like surfaces with a coating of mineral material, of stone or metal for example, such as natural or reconstituted marble stone, or terra cotta, as well as to surfaces with a coating of organic material, commonly known as plastic, or even surfaces with a parquet covering or walls having a stainless steel surface.

Thus only surfaces with what is commonly known as a three-dimensional lining are excluded in practice, that is to say surfaces with a fibrous lining such as carpets or the like.

As will be apparent, while the term "floors" may be utilized hereinafter for convenience, the term should be broadly construed to include any similar hard surface.

Heretofore, the products to be applied for the treatment of floors differ according to the nature of the latter, and two distinct types of treatment must be provided for each of them.

There is, first of all, generally speaking, a basic treatment that consists, for example, in a certain initial cleaning or scouring of the floor in question, and the establishment on the latter of a protective layer, and then there is a maintenance treatment proper only to the maintenance of the pre-treated floor.

While in every case, the maintenance can be considered as being based in general on the same process, commonly known as "spray" which consists in spraying on the surface an appropriate maintenance product combined with a mechanical action of brushing or polishing which can advantageously be done with the aid of a machine, the same is not true of the initial basic treatment.

In the case, for example, of floors of marble stone, such as, for example, "comblanchien" or travertine, this basic treatment up to now usually involves the development of a chemical reaction, commonly called crystallization, leading to the formation of a hard, shiny superficial layer on the surface of the floor material.

In the case of floors with an organic coating, the basic treatment consists in the application of a varnish, the desired shiny appearance then being simply a result of the subsequent polymerization of the latter, without any sort of chemical reaction with the subjacent lining.

It is not difficult to recognize that treatments differing so widely must require quite different products in order to carry them out. Also their application in conjunction is normally impossible since each mandates a special treatment, some of such treatments being inevitably manual, as when a varnish is applied, for example.

The present invention is based on the observation, surprising at first glance in view of the foregoing, that on the contrary it is possible to utilize in a polyvalent manner, for the treatment of all surfaces such as floors with a hard and smooth surface regardless of the nature of such a material, one and the same product.

The object of the invention is provision of such product.

Generally speaking, the product according to the invention, which is therefore intended for the treatment of any floor whatever, is characterized in that it contains, in particular, in combination, at least one acid, at least one silicone, a solvent for the said acid, a solvent for the said silicone and an emulsifier.

In the case of the acid, whose main function is a scouring where necessary, or a cleaning and the obtention of a certain shine, oxalic acid is preferred.

In order to reduce drying time, an alcohol base solvent, for example ethylalcohol, is used instead of the usual aqueous base solvent.

In some instances it may be appropriate to increase the flash point of the product; this can be achieved in replacing a portion of the alcohol solvents (the ethylalcohol, the isopropyl alcohol, the n-propyl alcohol) by an halogenated solvent such as a fluorochlorinated solvent and/or a chlorinated solvent such as 1-1-1 trichloroethane.

In the case of silicone, whose main function is to establish a water repellent protection and thus the assurance of a certain perpetuity for the preceding shine, moreover enhancing it, the product according to the invention contains as a matter of preference, in combination, several silicones, at least one of which is in the form of oil, and least one other of which is in the form of polymerizable resin.

The product according to the invention may thus contain for example a siloxane, more particularly a methylpolysiloxane, a dimethylpolysiloxane, a polydimethylsiloxane, or a methyltrimethoxysilane.

It may also contain a silicone-glycol copolymer.

In all cases, the corresponding solvent is in practice a hydrocarbon, for example white spirit or naphtha, and/or an alcohol, for example isopropyl alcohol or n-propyl alcohol.

As to the emulsifying agent, whose main function is to render the product according to the invention stable and hence directly usable commercially, without undue decantation or separation of one or more of the various ingredients, an alcohol is preferred, for example isopropyl alcohol or n-propyl alcohol.

Such an alcohol can, therefore, have at the same time a function as solvent for the silicone(s) employed and a function as emulsifier.

The product according to the invention is advantageously completed by a surface-active agent or surfactant, for example nonyl-phenol polyethoxylate, having notably a detergent function, and by a perfuming agent.

Besides its polyvalence, which thus makes it suitable indiscriminately for all floor and like surfaces having a hard and smooth consistency, the product according to the invention presents numerous advantages.

First of all, it can advantageously be employed with the aid of a brushing and buffing or polishing machine of the usual kind, in the manner of conventional "sprays".

No manual operation is therefore necessary.

Machines of the single brush type, rotating at speeds of approximately 400 rpm are particularly adapted to the application of the product according to the invention, although for certain compositions and/or utilizations, those running at lower speeds, equal, for example, to 180 rpm, will also be utilizable.

Preferably, however, relatively high speeds of rotation will be sought, with a view to associating, in synergy, the mechanical effects of brushing and/or polishing with the chemical and thermal effects due to the rise in temperature which is thus produced by the said high speeds of rotation.

Still higher rotation speeds, for example 500 to 2000 rpm, may cause excessively fast drying time which can produce inferior results; in said case it may be advisable to utilize an alcohol solution of less than 95 degrees (190 proof), for example 65 degrees (130 proof) which utilization will have the added advantage of resulting in a product with a higher PH factor.

In every case, and according to the traditional "spray" process, the product according to the invention is simply sprayed, first of all, on the floor to be treated, with a conventional sprayer, in bands, in squares or in any other mode of distribution.

The spray device utilized can, of course, be combined with the brushing and/or polishing machine used, since no drying need be provided between the spraying and the consecutive brushing or polishing.

The treated floor can therefore advantageously be reoccupied almost immediately without any significant temporary loss of the use of its surface.

The result, advantageously, is an appreciable saving in time for the parties concerned, and this is all the more true since, most often, a single application of the product according to the invention will suffice, with a single pass of the brushing and/or polishing machine.

For the treatment of certain porous floors, in particular, floors comprised of unvarnished terra cotta, it is, however, sometimes necessary to proceed with a preliminary impregnation of this type of floor.

In all cases, and according to another advantage of the invention, the same product will serve both for the basic treatment of a floor and for its maintenance.

Moreover, the product according to the invention lends itself advantageously, without leaving a trace of any repeats or overlapping or abutting junctions even by superposition, where as a result of a local deterioration of the appearance of the floor, a repeat of such treatment is necessary.

It has been found, as a matter of fact that, assuming the application of the product according to the invention leads per se to the formation of marks, these marks are eliminated automatically by the process of brushing or polishing, combined with such an application because, according to the invention, these two operations are conducted essentially simultaneously.

By way of nonlimiting illustration, four general examples of composition will be given which prove particularly satisfactory for the product according to the invention:

EXAMPLE I

For approximately one liter:
methylpolysiloxane: 5 to 15 ml and for example 10 ml
dimethylpolysiloxane: 3.5 to 7.5 ml and for example 5 ml
polydimethylsiloxane: 1.5 to 5 ml and for example 3 ml
copolymer of silicone-glycol: 3.5 to 7.5 ml and for example 5 ml
oxalic acid: 10 to 60 g, and for example 25.5 g
scent: 1 to 7.5 ml and for example 2.5 ml
nonyl-phenol polyethoxylate: 3.5 to 10 ml and for example 7.5 ml
ethyl alcohol: 100 to 600 ml and for example 340 ml
isopropyl or n-propyl alcohol: 100 to 600 ml and for example 340 ml
White spirit: 100 to 400 ml and for example 287 ml

EXAMPLE II A

For approximately one liter:
methylpolysiloxane: 5 to 15 ml and for example 10 ml
dimethylpolysiloxane: 3.5 to 7.5 ml and for example 5 ml
polydimethylsiloxane: 1.5 to 5 ml and for example 3 ml
copolymer of silicone-glycol: 3.5 to 7.5 ml and for example 5 ml
oxalic acid: 10 to 60 g, and for example 25.5 g
scent: 1 to 7.5 ml and for example 2.5 ml
nonyl-phenol polyethoxylate: 3.5 to 10 ml and for example 7.5 ml ethyl alcohol solution at 95° 50 to 400 ml and for example 200 ml
1-1-1 trichloroethane: 50 to 250 ml and for example 150 ml
isopropyl or n-propyl alcohol: 100 to 600 ml and for example 340 ml
White spirit: 100 to 400 ml and for example 287 ml

EXAMPLE II B

Same formulation as Example II A, except that the ethyl alcohol solution at 95° is replaced by identical quantities of an alcohol solution at 65°.

EXAMPLE III

For approximately one liter:
methylpolysiloxane: 5 to 15 ml and for example 10 ml
dimethylpolysiloxane: 3.5 to 12 ml and for example 6 ml
methyltrimethoxysilane: 4 to 20 ml and for example 10 ml
copolymer of silicone-glycol: 0 to 5 ml and for example 2 ml
oxalic acid: 10 to 60 g and for example 36 g
scent: 1 to 7.5 ml and for example 5 ml
nonyl-phenol polyethoxylate: 0 to 10 ml and for example 5 ml
ethyl alcohol: 500 to 950 ml and for example 900 ml
isopropyl or n-propyl alcohol: 30 to 200 ml and for example 60 ml
white spirit (terpentine): 0 to 200 ml and for example 0 ml

EXAMPLE IV A

For approximately on liter:
methylpolysiloxane: 5 to 15 ml and for example 10 ml
dimethylpolysiloxane: 3.5 to 12 ml and for example 6 ml
methyltrimethoxysilane: 4 to 20 ml and for example 10 ml
copolymer of silicone-glycol: 0 to 5 ml and for example 2 ml
oxalic acid: 10 to 60 g and for example 36 g
scent: 1 to 7.5 ml and for example 5 ml
nonyl-phenol polyethoxylate: 0 to 10 and for example 5 ml ethyl alcohol solution at 95° 240 to 820 ml and for example 710 ml
isopropyl or n-propyl alcohol: 20 to 100 ml and for example 40 ml
1-1-1 trichloroethane: 30 to 250 ml and for example 180 ml
white spirit (terpentine): 0 to 200 ml and for example 0 ml

EXAMPLE IV B

Same formulation as Example IV A, except that the ethyl alcohol solution at 95° is replaced by identical quantites of an alcohol solution at 65°

With reference to Examples III and IV, in the event the quantity of white spirit involved is decreased or even zero, the function of solvent for the silicones is partially or totally taken over by the isopropyl or n-propyl alcohol, in addition to its function as emulsifier.

For example, for methylpolysiloxane, the resin sold under the brand name "RHODORSIL":, reference resin 4518, can be suitable.

Likewise, for dimethylpolysiloxane, the oil sold under the brand name "RHODORSIL", reference fluid 47 V 300 or 350 can be used; this, in practice, is a dimethylpolysiloxane with linear chain.

Likewise, for polydimethylsiloxane, the oil sold under the brand name "RHODORSIL", reference oil 43 V 120 can be suitable.

As a corollary, for methyltrimethoxysilane, the silane sold under the brand name "DOW CORNING", reference Z 6070 silane, proves satisfactory.

As for the copolymer of silicone-glycol, this can be, for example, the oil sold under the brand name "RHODORSIL", reference oil 10646.

But of course, other products having the same function and marketed under different brand names can also be suitable, and it would not be outside the scope of the present invention to substitute such products for those mentioned more explicitly here.

Having thus described the invention and illustrated its use, what is claimed as new and is desired to be secured by Letters Patent in the United States is:

1. A product for treating a floor comprising at least one acid capable of cleaning the floor and imparting an enhanced shine thereto, a plurality of silicones capable of imparting water repellency, at least one solvent for said acid, at least one solvent for said plurality of silicones and at least one agent capable of emulsifying said acid, said plurality of silicones and said solvents.

2. A product in accordance with claim 1 wherein said acid comprises oxalic acid.

3. A product in accordance with claim 1 wherein said silicone component is comprised of a first silicone composition in the form of an oil and a second silicone composition in the form of a polymerizable resin.

4. A product in accordance with claim 3 wherein said silicone component comprises at least a siloxane selected from the group consisting of a methylpolysiloxane, a dimethylpolysiloxane, a polydimethylsiloxane or a methyltrimethoxysilane.

5. A product in accordance with claim 4 and including a copolymer of silicone-glycol.

6. A product in accordance with claim 4 wherein the solvent for said acid is ethyl alcohol.

7. A product in accordance with claim 4 wherein the solvent for said acid is ethyl alcohol, associated with an halogenated solvent such as a fluorochlorinated solvent and/or a chlorinated solvent such as 1-1-1 trichloroethane.

8. A product in accordance with claim 4 wherein the emulsifier is selected from the group consisting of isopropyl alcohol or n-propyl alcohol.

9. A product in accordance with claim 4 wherein the emulsifier is selected from the group consisting of isopropyl alcohol or n-propyl alcohol, associated with an halogenated solvent such as a fluorochlorinated solvent and/or a chlorinated solvent such as 1-1-1 trichloroethane.

10. A product in accordance with claim 4 wherein the solvent for said silicone components comprises a liquid hydrocarbon such as white spirit or naphtha.

11. A product in accordance with claim 8 wherein said alcohol composition is present in quantity sufficient to function as a solvent for said silicone components.

12. A product in accordance with claim 1 and including a surfactant.

13. The product in accordance with claim 12 where the surfactant comprises nonyl-phenol polyethoxylate.

14. A product for treating floors and like surfaces comprising in combination an acid solution, a silicone oil, a polymerizable silicone resin, a solvent for said silicones, and an emulsifier, said product being in the form of a readily spread liquid.

15. A product in accordance with claim 1 wherein said acid comprises oxalic acid present in a concentration of from 10 to 60 grams per liter and said silicones are present in concentrations of from about 13.5 to 52 ml per liter.

16. A product in accordance with claim 1 wherein said solvent comprises an alcohol selected from the group consisting of ethyl alohol, isopropyl alcohol and n-propyl alcohol.

17. A product in accordance with claim 14 and including a surfactant.

* * * * *